United States Patent
O'Brien (10) Patent No.: US 9,410,568 B2
(45) Date of Patent: Aug. 9, 2016

(54) RAIL ATTACHMENT DEVICE

(71) Applicant: Daniel K. O'Brien, Hudson, WI (US)

(72) Inventor: Daniel K. O'Brien, Hudson, WI (US)

( * ) Notice: Subject to any disclaimer, the term of this patent is extended or adjusted under 35 U.S.C. 154(b) by 27 days.

(21) Appl. No.: 14/591,451

(22) Filed: Jan. 7, 2015

(65) Prior Publication Data

US 2016/0195121 A1    Jul. 7, 2016

(51) Int. Cl.
*F16B 12/14*    (2006.01)

(52) U.S. Cl.
CPC ........... *F16B 12/14* (2013.01); *F16B 2012/145* (2013.01)

(58) Field of Classification Search
CPC .......... F16B 12/14; F16B 12/18; F16B 12/20; F16B 12/32; F16B 12/2009; F16B 12/2027; F16B 12/2036; F16B 12/2054; F16B 12/2063; Y10T 403/4602; Y10T 403/4642
See application file for complete search history.

(56) References Cited

U.S. PATENT DOCUMENTS

| | | | | |
|---|---|---|---|---|
| 4,047,822 A | * | 9/1977 | Lehmann | F16B 12/2036 403/187 |
| 4,116,573 A | * | 9/1978 | Fuchs | F16B 5/0607 403/187 |
| 4,341,485 A | * | 7/1982 | Appleby | F16B 12/2063 403/231 |
| 4,487,522 A | * | 12/1984 | Appleby | F16B 12/2063 403/231 |
| 4,826,345 A | * | 5/1989 | Salice | F16B 12/2063 403/231 |
| 4,957,386 A | * | 9/1990 | Harley | F16B 12/2063 403/231 |
| 8,992,114 B2 | * | 3/2015 | Ajanovic | F16B 12/2063 403/231 |

FOREIGN PATENT DOCUMENTS

DE    4039806 A1 *    6/1992    ............ F16B 7/0446

* cited by examiner

*Primary Examiner* — Daniel Wiley

(74) *Attorney, Agent, or Firm* — Nikolai & Mersereau PA; Thomas J. Nikolai (57) ABSTRACT

A strong and repeatedly adjustable butt joint is provided between two members using an apparatus comprising an elongate connecting screw extending from one of the two members to be joined and through a through hole and into an access opening of the other of the two members to be joined. Positioned within the access opening is a lock comprising a housing, wedge and drive screw. The drive screw moves and then holds the wedge in a locked position capturing the connecting screw to create the butt joint.

10 Claims, 8 Drawing Sheets

Fig. 19 though the bolt threads are typically covered with wood debris from the drilling process. Tightening the nut tends to be a tedious exercise involving the use of a deep well socket barely small enough to fit through the access hole.

RAIL ATTACHMENT DEVICE

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

A. Field of the Invention

The present invention relates to abutting two pieces of material and then joining them together. More specifically, the present invention relates to devices which may be employed to efficiently create an effective butt joint between two pieces of material.

B. Description of the Prior Art

Butt joints are commonly used in construction of all types. The two members to be joined together are simply cut to length at the desired angle, butted against each other and fastened together using any of various suitable means such as adhesives, screws, nails or a nut in combination with a bolt.

When adhesives are employed, the butt joint is often reinforced with a biscuit or dowels. Holes are drilled into the two members. One end of the biscuit or dowel is inserted into the hole drilled into the first member and the other end of the biscuit or dowel is inserted into the hole drilled into the second member.

Various "knock-down" fasteners have been developed which enable a butt joint between two objects to be assembled and disassembled repeatedly. Such fasteners are often used to assemble inexpensive prefabricated furniture such as bookcases, TV stands, or the like. These fasteners usually consist of a cam dowel screwed into one of the two members to be joined and a cam lock coupled to the other of the two members to be joined. The two members to be joined are brought together so the cam dowel engages the cam lock. A tool is then used to turn the cam lock to secure the two members together. Use of these fasteners typically requires special tools and jigs. As a result, their use is typically limited to mass-produced, as opposed to custom, items. Further, such items are typically stationary in nature and not subjected to repetitive stresses and forces like a railing system. Efforts to employ these fasteners in the construction of railing systems have been unsatisfactory.

Figure 1:
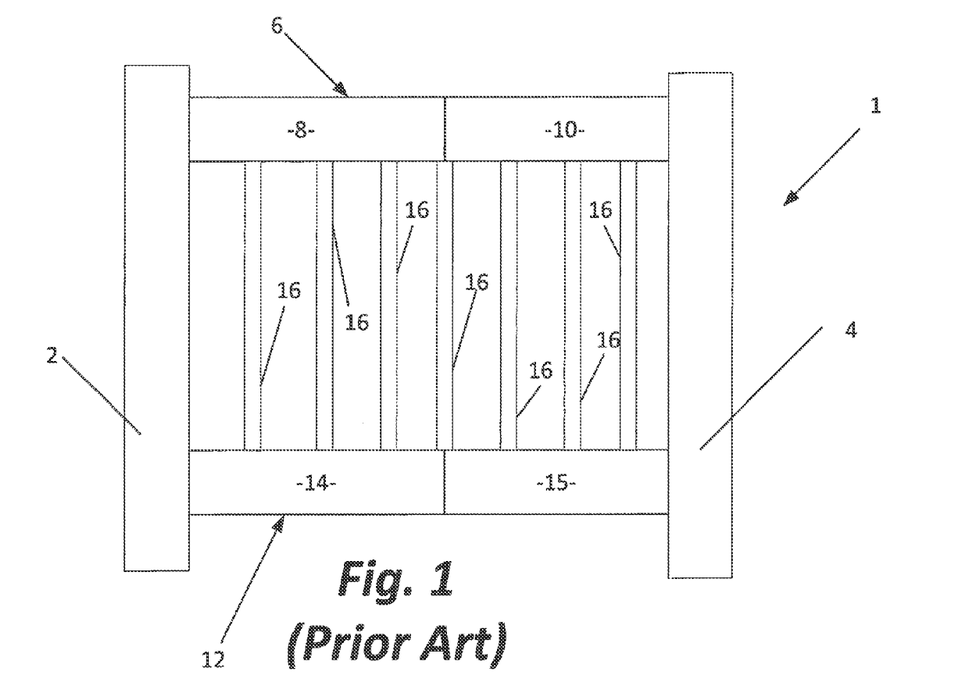
FIG. 1 shows a typical railing assembly for a level surface known in the prior art.
Figure 2:
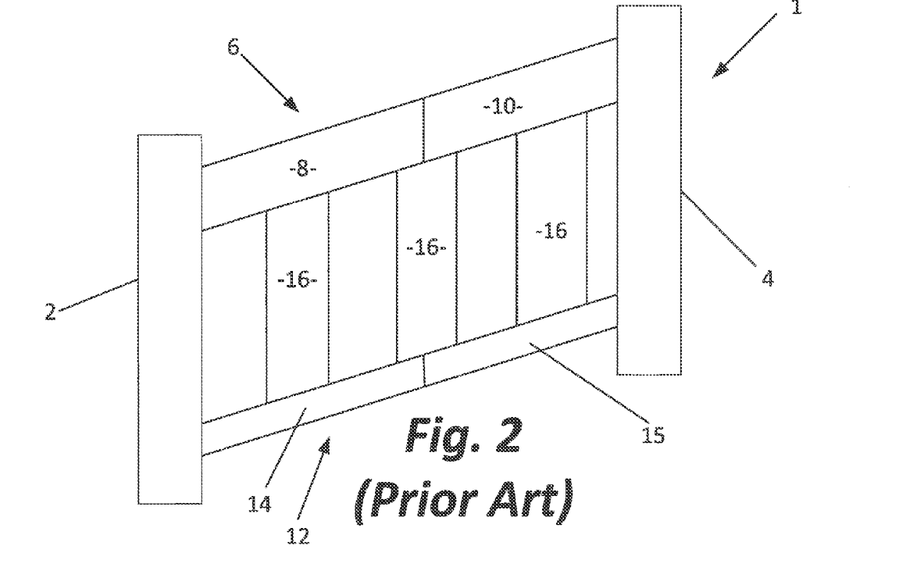
FIG. 2 shows a typical railing assembly for an incline such as a ramp or staircase known in the prior art.

A variety of butt joints are found in railing systems. The main components of railing systems are shown in FIGS. 1 and 2. FIG. 1 shows a railing system typically used on a flat, level surface such as a floor or deck. FIG. 2 represents a railing system used on a sloped structure such as a stairway or ramp. Both railing systems have features in common.

The sections of railing 1 shown in FIGS. 1 and 2 each include a pair of newel posts 2 and 4, a top rail 6 comprising sections 8 and 10, a bottom rail 12 comprising sections 14 and 15 and a plurality of balusters 16. These components may be collectively referred to as balustrade. Butt joints are used to join sections 8 and 10 of top rail 6 together and to join the ends of top rail 6 to the newel posts 2 and 4. Likewise, butt joints are used to join sections 14 and 15 of bottom rail 12 together and to join the ends of bottom rail 12 to the newel posts 2 and 4. Butt joints are used to join the bottom of each baluster 16 to the bottom rail 12 and the top of each baluster 16 to the top rail 6. Butt joints are also used to couple the newel posts 2 and 4 to the floor (not shown). Thus, in FIG. 1 alone, there are twenty-two separate butt joints.

Figure 3:
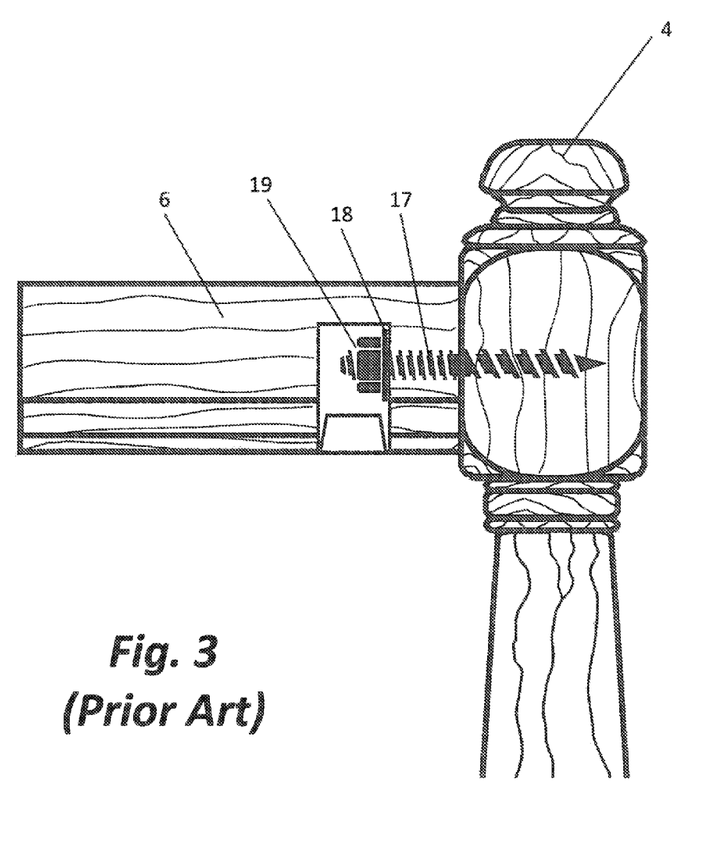
FIG. 3 shows a hanger bolt, washer and nut being employed to connect a rail to a newel post.

Creating a stable and aesthetically pleasing railing system tends to be a very laborious task requiring considerable craftsmanship and skill. Great care must be taken to ensure all the parts shown in FIGS. 1 and 2 are properly aligned and suitably fastened together. In the past, adhesives in combination with biscuits and/or dowels have been employed so that the attachment mechanism is hidden from view. More commonly, and as illustrated in FIG. 3, (also known as hanger bolts) have been employed to make connections when constructing a railing system.

Using dowels and biscuits require great care. If the holes in the two members into which the dowels and biscuits are inserted are not drilled at the correct location, problems with alignment will occur. Also, adhesives require time to dry and, after years of use, will eventually fail. One reason for such failure is expansion and contraction of the wood due to changes in the humidity of the air. Another is the repeated stresses applied to railing systems during use. When screws or nuts and bolts are used, care must be taken, not only to ensure proper alignment, but also to hide the hardware from view. Also, the hardware must typically be recessed with respect to the surfaces of the members to be joined for aesthetic reasons and so the hands of people using the railing are not scratched by the hardware.

While dowels and glue are acceptably employed to mount the balusters of a railing, a stronger and longer lasting mechanism is required for joining two sections of a rail together and to join the ends of a rail to the newel posts. The same is true for joining the bottom of a newel post to the floor. Thus, there is a real need for a mechanism for making a secure and stable butt joint and that allows for periods of adjustment over time to address shrinkage or expansion of the material from which the rails and newel posts are made.

Those skilled in the art recognize that considerable forces are repeatedly encountered by the newel posts and rails over time which can cause these joints to fail unless strong enough hardware is employed. In the prior art, and as illustrated in FIG. 3, relatively large hanger bolts 17 have been employed to attach an end of a rail 6 to a newel post 4. Hanger bolts have two threaded sections, one adapted to screw into the post and the other adapted to receive a nut such as 19. To attach the first end of bolt 17 to the newel post 4, a pilot hole is typically drilled into the newel post 4 and the first end of bolt 17 is screwed into the post 4. Since the bolt 17 has no head, the bolt 17 is typically turned into the newel post 4 using pliers, vice grips or other wrench to grip the second end of the bolt. Care must be taken no ensure the bolt 17 is gripped with an adequate pinching force to allow the first end of bolt 17 to be screwed into the post 4. At the same time, if the tool is applied too tightly, damage will occur to the threads of the second end of the bolt 17 making attachment of the nut 19 difficult or impossible.

This is not the only problem associated with the prior art attachment mechanism shown in FIG. 3. This attachment mechanism requires a relatively large access hole be drilled in from the bottom of the rail 6 and a second through hole is drilled inwardly from the end of the rail until it intersects the access hole. The second end of the hanger bolt is then inserted into the through hole from the end of the rail and advanced until the second end of the hanger bolt resides in the access hole. A washer 18 is then placed over the second end of the hanger bolt via the access hole. This is not an easy task given the size of the access hole relative to the size of the washer and fingers of the installer. After the washer is in place a tightening nut must be started on the threads of the second end of the bolt 17. Again, this is a difficult task because the longitudinal axis of the bolt is perpendicular to the longitudinal axis of the access hole and because the space within the access hole is very limited. It has been reported that in some instances it takes as much as a half hour to install the washer 18 and start the nut 19 onto the hanger bolt 17.

Of course, the connection between the newel post 4 and rail 6 will not be secure unless and until the nut 19 is turned tight. A wrench is typically employed to do so. The wrench extends into the access hole and is, of course, held generally perpendicular to the longitudinal axis of bolt 17. Rotation of the wrench to turn the nut 19 relative to the bolt 17 is limited by the thickness of the shaft of the wrench and the size of the axis hole making tightening the bolt a difficult and awkward task. Further, the position of the balusters and newel posts relative to the wrench can also interfere with tightening of the nut. Even more significant are the challenges faced when the bottom of the rail 6 is at an angle less than 90 degrees relative to the newel post. See, for example, the angle between the bottoms of rails 6 and 12 relative to the newel post 4 in FIG. 2. The smaller this angle, the more the newel post 4 interferes with the use of the wrench to tighten nut 19 onto the bolt 17.

The technique described above has been employed to attach sections of rail together and the bottom of a newel post to a floor, but with similar difficulty. Thus, there is also a real need for hardware that is easier to install and has suitable strength.

In view of the foregoing and in summary, there is a real need for a simple and easy-to-install mechanism for creating a secure, durable, and repeatedly adjustable butt joint between two members

SUMMARY OF THE INVENTION

The present invention provides devices for securing two members together. More specifically, such devices include a connecting screw having a projecting head; an assembly comprising a cylinder body, a wedge and a drive screw; and an optional plug. These devices are employed as follows:

- An access hole is drilled into the first of the two members to be joined, e.g., the bottom of the first member to be joined.
- A through hole is drilled into the end of the first of the two members to be joined so that the through hole intersects the access hole.
- A pilot hole is drilled into the second member.
- The connecting screw is then screwed into the pilot hole of the second member a predetermined distance such that the connecting screw is attached to and projects from the second member.
- The two members are then brought together. More specifically, the projecting head of the connecting screw attached to the second member passes from the end of the first member through the through hole and into the access hole.
- The assembly comprising the cylinder body, wedge and drive screw is inserted into the access hole such that the top of the wedge resides at a location immediately adjacent the underside of the head of the connecting screw.
- The drive screw is tightened moving and locking the wedge against the head of the connecting screw securely fastening the first and second members together.

Optionally, a suitable adhesive may be applied between the abutting surfaces of the two members to be joined before tightening the drive screw. Likewise, a plug may be glued in place within or over the access hole to conceal the components of the device used to couple the two members together.

Various adjustments may be made to ensure a secure attachment between the first and second members. For example, the depth into which the connecting screw is screwed into a member may be adjusted. The connecting screw may be bent to ensure it passes properly through the through hole and meshes properly with the wedge and cylinder body. The depth of the drive screw is universally adjustable.

The invention will be better understood from a review of the accompanying drawings in conjunction with the detailed description which follows.

DETAILED DESCRIPTION

The following discussion is presented to enable a person skilled in the art to make and use the present teachings. Various modifications to the illustrated embodiments will be readily apparent to those skilled in the art, and the principles described herein may be applied to other embodiments and applications without departing from the present invention. Thus, the present invention is not intended to be limited to embodiments shown, but is to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present invention. Skilled artisans will recognize many useful alternatives to the teachings and the examples provided herein falling within the scope of the invention exist and may be employed without deviating from the invention.

This description of the preferred embodiment is intended to be read in connection with the accompanying drawings, which are to be considered part of the written description of this invention. In the description, relative terms such as "lower", "upper", "horizontal", "vertical", "above", "below", "up", "down", "top", and "bottom", as well as derivatives thereof (e.g., "horizontally", "downwardly", "upwardly", etc.) should be construed to refer to the orientation as then described or as shown in the drawings under discussion. These relative terms are for convenience of the description and do not require that the apparatus be constructed or operated in the orientation shown in the drawings. Further, terms such as "connected", "connecting", "attached", "attaching", "joined", and "joining" are used interchangeably and refer to one structure or surface being secured to another structure or surface or integrally fabricated in one piece, unless expressly described otherwise.

Figure 4:
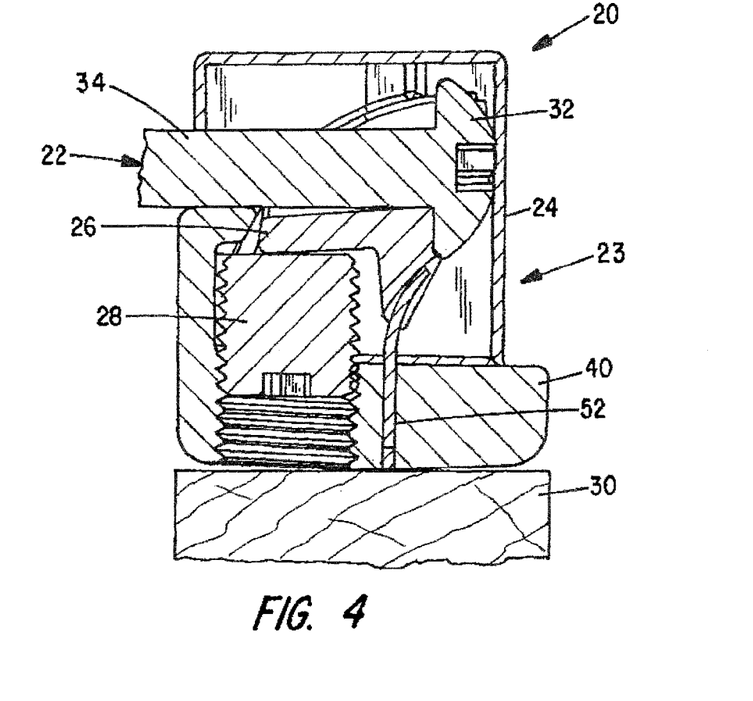
FIG. 4 is a cross-sectional view of a first embodiment in the locked condition.
Figure 5:
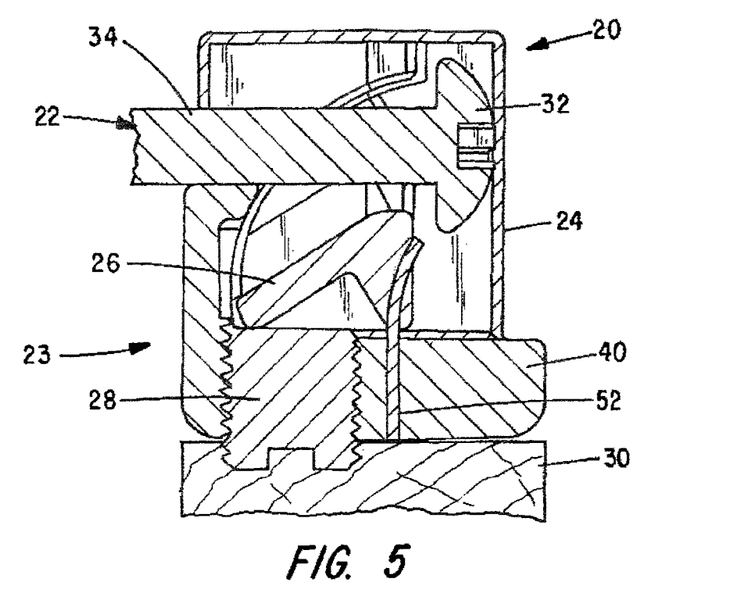
FIG. 5 is a cross-sectional view of the embodiment of FIG. 4 in the unlocked condition.
Figure 6:
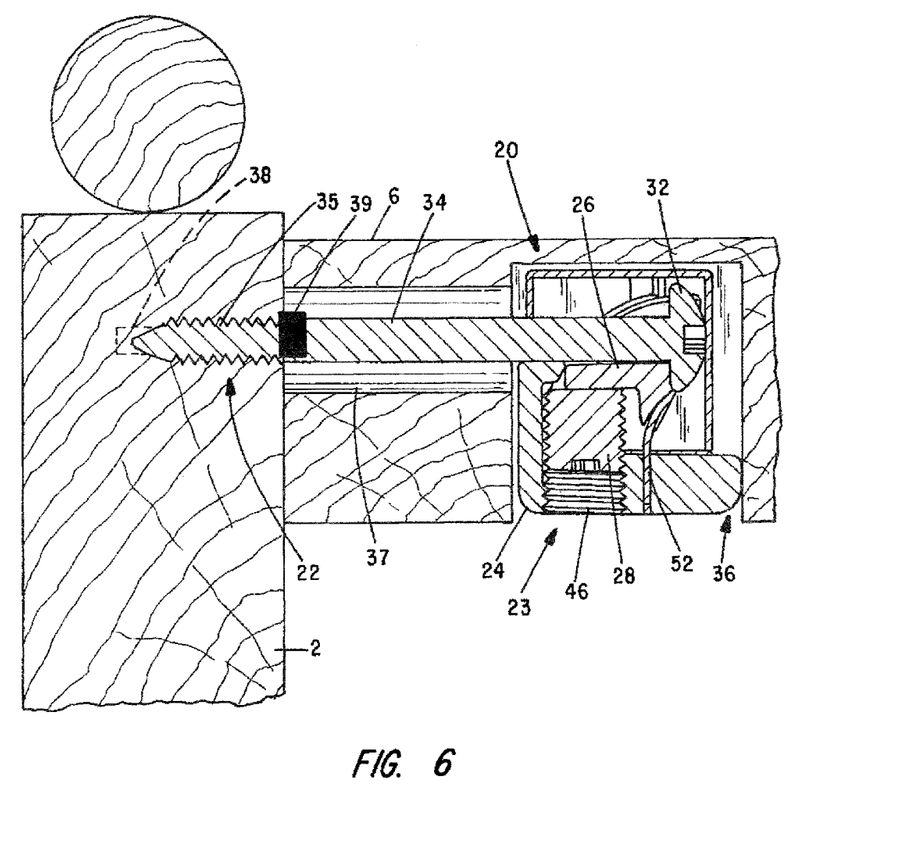
FIG. 6 is a cross-sectional view showing the embodiment of FIG. 4 employed to create a butt joint between a hand rail and a newel post of a railing.
Figure 7:
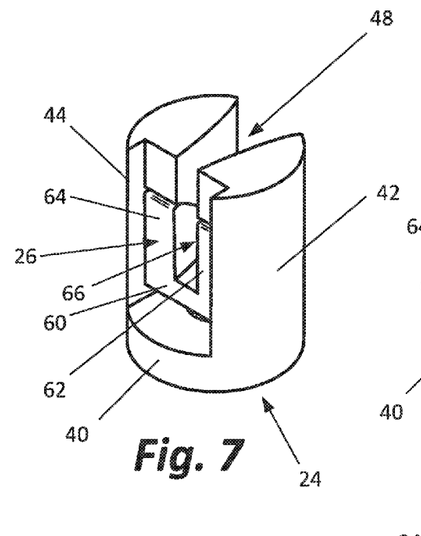
FIG. 7 is a perspective view of the cylinder and wedge of the embodiment shown in FIG. 4.
Figure 8:
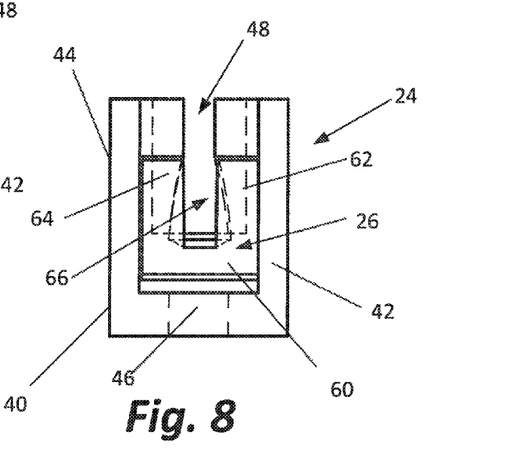
FIG. 8 is a front view of the cylinder and wedge of FIG. 7.
Figure 9:
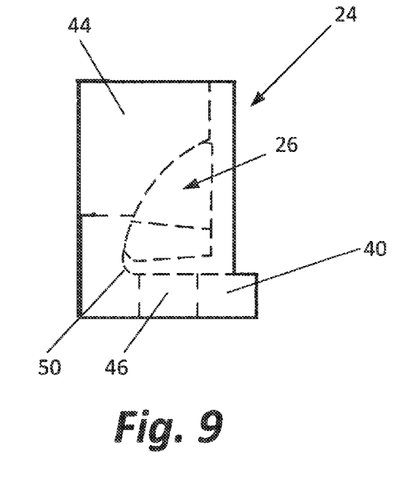
FIG. 9 is a side view of the cylinder of FIG. 7.
Figure 10:
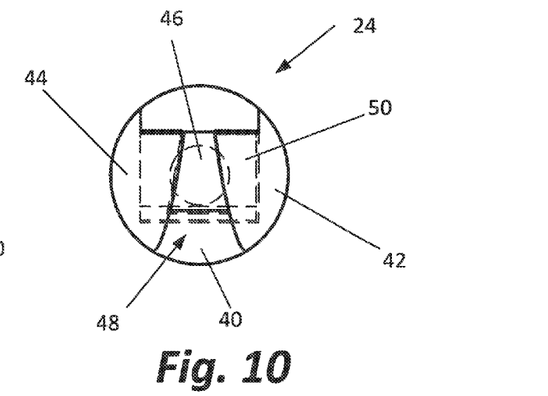
FIG. 10 is a bottom view of the cylinder of FIG. 7.
Figure 11:
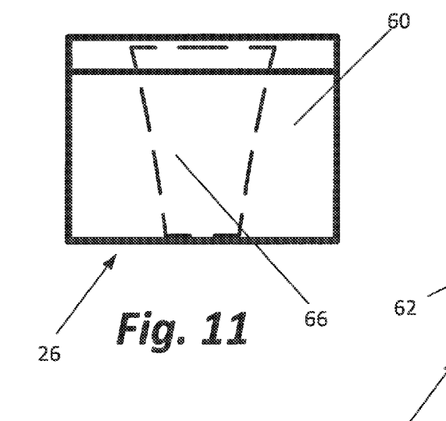
FIG. 11 is a top view of the wedge of the embodiment shown in FIG. 4.
Figure 12:
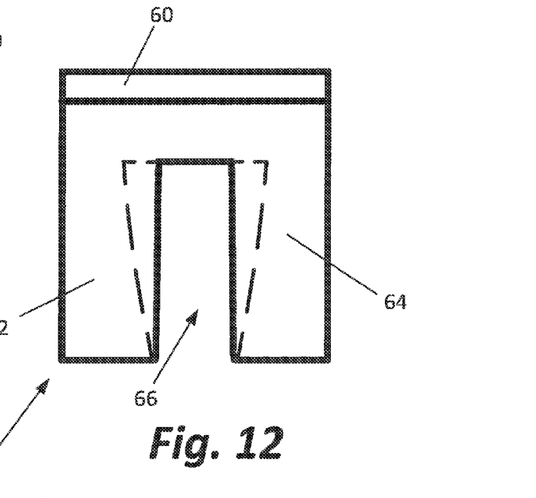
FIG. 12 is a front view of the wedge of FIG. 11.
Figure 13:
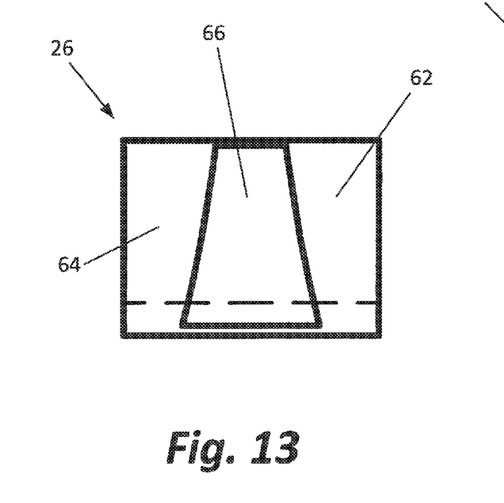
FIG. 13 is a bottom view of the wedge of FIG. 11.
Figure 14:
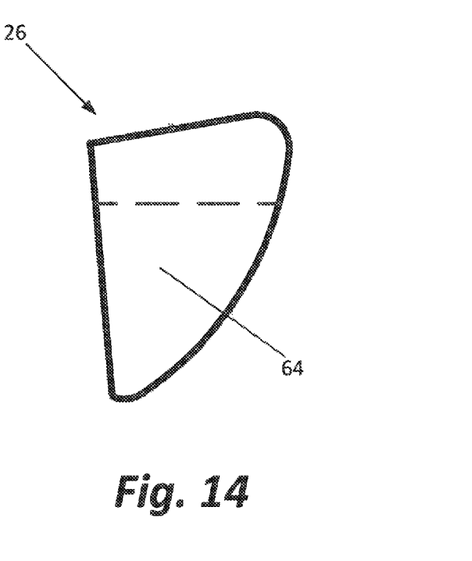
FIG. 14 is a side view of the wedge of FIG. 11.

FIGS. 4-6 show an apparatus 20 for successfully creating a stable and secure butt joint between two members. In FIG. 6, the two members happen to be a newel post 2 and a top rail 6 of a railing assembly. It should, however, be recognized that the apparatus 20 may be used to create such a butt joint between any two members of the railing system shown in FIGS. 1 and 2 or to create any other butt joint between two members whether they are part of a railing system or not.

The apparatus 20 comprises an elongate connecting screw 22 and an assembly 23 comprising a cylinder body 24, a wedge 26 and a drive screw 28. A plug 30 is also illustrated in FIGS. 4 and 5. By comparing FIGS. 4 and 5, one can see that turning the drive screw 28 in a first direction pivots the wedge into locking engagement with the head 32 and shaft 34 of the connecting screw 22 thereby locking the connecting screw 22 to the assembly 23 as shown in FIGS. 4 and 6. Turning drive screw 28 in the opposite second direction loosens the screw and serves to unlock the wedge 26 of the assembly 23 from the head and shaft of connecting screw 22 as shown in FIG. 5.

Further details related to the construction of the various components of apparatus 20 are provided below. An example of how to use the apparatus 20 will now be described with reference to FIG. 6.

First, an access hole 36 is drilled into the bottom of member 6. The access hole should be a sufficient distance from the end of the member so as to not substantially weaken the member. The size of the access hole 36 and distance from the end will also depend upon the dimensions of the components of apparatus 20 and the materials from which the two members to be joined together are made. By way of example, in a wooden railing system the access hole should optimally be drilled 1.5" from the end of the rail 6 and centered side-to-side. The access hole in this example has a 1" diameter and approximately a 1.75" depth. Other dimensions may be employed without deviating from the invention. Those discussed herein simply provide a representative example of dimensions which may be used.

Second, a through hole 37 is drilled in from the end of rail 6. In the example described, this through hole should be positioned 1" up from the bottom of the rail, centered from side-to-side and deep enough to intersect the access hole 36. In this example, the through hole has a ½" diameter.

Third, in the example described, a 3/16" pilot hole 38 should be drilled into the surface of the newel post 2 which will engage the end of the rail 6 when the butt joint is formed. This pilot hole 38 should be drilled at a corresponding location to the through hole 37 (in this example, 1" up from where the bottom of the rail 6 will intersect the newel post 2).

Fourth, the threaded section 35 of connecting screw 22 is partially screwed into the pilot hole (using a standard screwdriver, drill adaptor or other suitable tool) to a predetermined depth which may be marked on the screw. The screw may also be provided with a depth marker 39 surrounding the shaft of the screw 22 at the proper location to ensure the screw 22 is not driven too deeply into the newel post 2.

Fifth, the post 2 and rail 6 are then dry fit. More specifically, the head 32 of screw 22 is passed through the through hole 37 until the head 32 of screw 22 reaches the access hole 36. The assembly 23 comprising the cylinder 24, wedge 26 and drive screw 28 is then inserted through the bottom of rail 6 into the access hole 36 so that the underside of the shaft 34 and head 32 of connecting screw 22 are immediately above and aligned with the wedge 26. At this point, suitable adjustments may be made by moving the assembly 23 up or down or rotating the assembly 23. Further adjustment may be made by adjusting the depth into which the connecting screw is screwed into the newel post 2 or by bending the exposed portion of the shaft 34 of screw 22 slightly. These adjustments ensure the rail 6 and post 2 will be joined together at the proper location and angle.

Sixth, an adhesive may be applied between the surface of rail 6 and post 2 to be butted together.

Finally, the drive screw 28 is turned causing the drive screw 28 to move from the position shown in FIG. 5 to the position shown in FIG. 6. This movement of the drive screw 28 imparts motion to the wedge 26 so that the wedge 26 moves from the unlocked position shown in FIG. 5 to the locked position shown in FIG. 6. From FIGS. 5 and 6, one will appreciate that turning the drive screw 28 in a first direction moves the wedge 26 into locking engagement with the shaft 34 and head 32 of connecting screw 22. The drive screw 28 holds the wedge 26 in the locked position of FIG. 5 unless and until the drive screw 28 is turned in a second direction unlocking the assembly.

FIGS. 7-10 show, in further detail, the construction of cylinder 24 and how the cylinder 24 is arranged with the wedge 26. As illustrated, the cylinder 24 has a circular base 40. Extending from the base 40 are two wall sections 42 and 44. A threaded bore 46 extends through the base 40. Threaded bore 46 is adapted to receive the drive screw 28. The threads of drive screw 28, of course, mesh and cooperate with the threads of bore 46 so that the drive screw 28 can be advanced to and held in the locking position shown in FIG. 6 and retracted into the unlocked position of FIG. 5, as desired. The two wall sections 42 and 44 define a slot 48 adapted to permit the shaft of connecting screw 22 to pass through slot 48 and between the two wall sections 42 and 44. The wall sections 42 and 44 also define a recess 50 shown in dashed lines in FIGS. 9 and 10. The wedge 26 is received with recess 50 and allowed to move between the locked and unlocked positions. A tether 52 may be employed to secure the wedge 26 in place inside the recess 50 as shown in FIGS. 4-6. In the embodiment illustrated in FIGS. 4-14, the wedge 26 and recess 50 are shaped such that the wedge is pivoted inside the recess 50 from the unlocked position to the locked position by movement of the drive screw 28.

FIGS. 11-14 show the shape of the wedge 26. The wedge 26 includes a base 60 and a pair of walls 62 and 64 extending from the base 60 and defining a slot 66. The slot 66 is adapted to receive the shaft of the connecting screw 22 as the wedge 26 is pivoted by drive screw 28, while at the same time engaging the head 32 of connecting screw 22 to securely join the two members (e.g., 2 and 6) together. The slot 66 may also be tapered.

Figure 15:
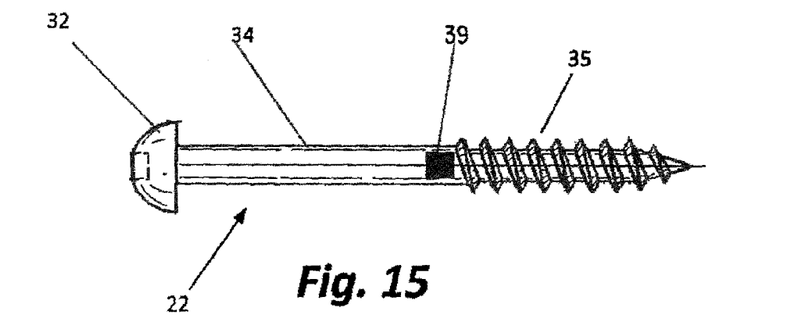
FIG. 15 is a side view of a first alternative embodiment of a connecting screw.
Figure 16:
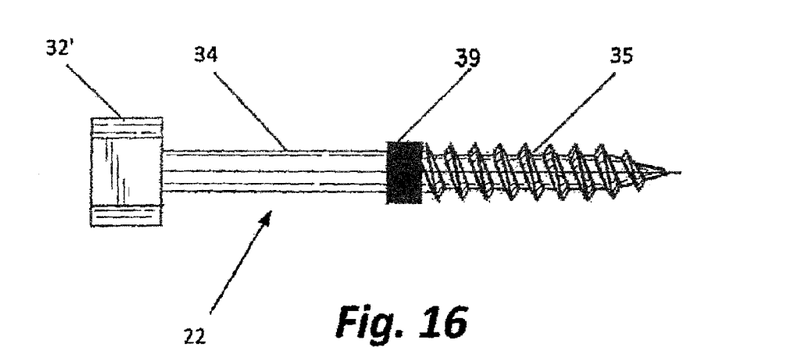
FIG. 16 is a side view of a second alternative embodiment of a connecting screw.
Figure 17:
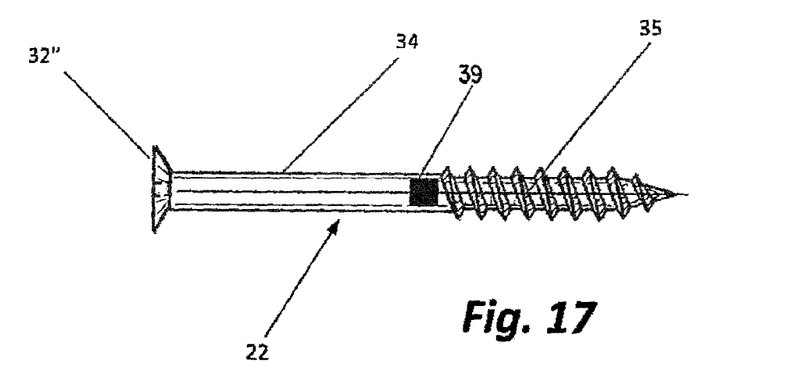
FIG. 17 is a side view of a third alternative embodiment of a connecting screw.

FIGS. 15 through 17 show alternative embodiments of exemplary connecting screws 22. In FIG. 15, the connecting screw has a shaft 34 extending between a head 32 and a threaded section 35. While, as shown, the threaded section 35 does not extend to the head 32, the threaded section certainly may without deviating from the invention. The screw shown is also provided with a depth marker 39. The depth marker 39 is used when attaching the screw 22 to the newel post 2 (or other similar member) to ensure the screw is driven into the member far enough to securely affix the screw 22 to the newel post 2, but not so far that the head 32 cannot reach the access hole 36 and be positioned properly with respect to the wedge. In FIGS. 15 and 17, the head is shown as having a recess which allows a screwdriver or the like to mate with the screw 22 for driving the screw 22 into the newel post 2. The recess may be adapted to receive the driving end of any tool used to screw the threads into the post. The screw 22 shown in FIG. 16 has many of the same features. However, the screw 22 of FIG. 16 has a collar as its depth marker 39 which stops the screw 22 from being driven too far into the newel post 2. Also, the head 32' shown in FIG. 16 is a hex head suitable for use with a box wrench, socket wrench, pliers, or the like, for driving the screw 22 into the newel post 2. FIG. 17 shows a head 32" which includes a taper from the shaft 34 rather than being joined to the shaft at a right angle. While the screws illustrated in the drawings include either a depth marking or collar, screws not including such features may be employed without deviating from the invention.

Figure 18:
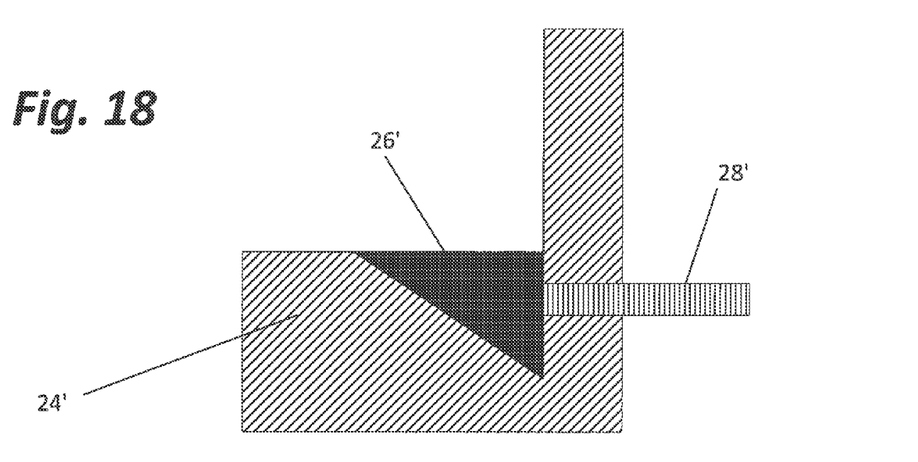
FIG. 18 is a cross-sectional view of an alternative embodiment of the cylinder, wedge and drive screw with the wedge in the unlocked position.
Figure 19:
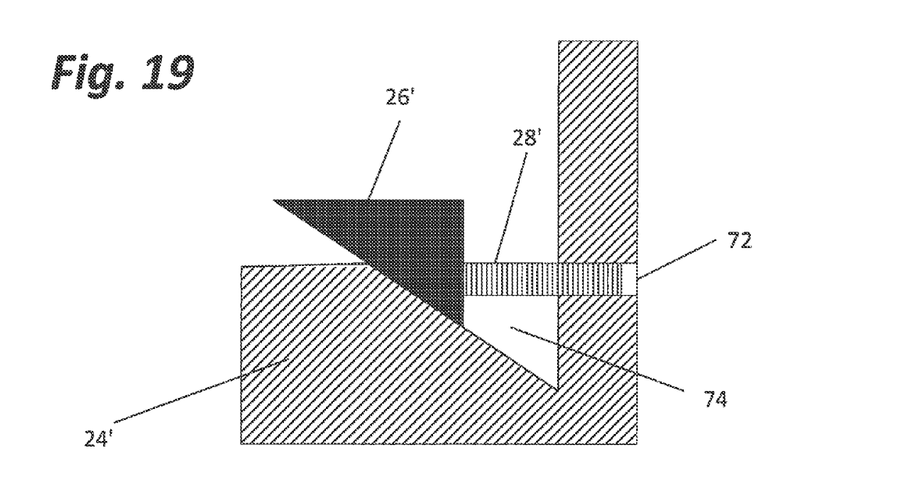
FIG. 19 is a view like FIG. 14, but with the wedge in the locked position.

While the embodiment shown in FIGS. 4-14 shows a pivoting wedge, FIGS. 18 and 19 are provided to show the wedge 26' and housing or cylinder 24' may be alternatively adapted such that the wedge 26' is slid rather than pivoted by turning the drive screw 28'. More specifically, FIGS. 18 and 19 show a housing or cylinder 24' having a threaded bore 72 and wedge recess 74. These figures also show a wedge 26' adapted to be moved in and out of the wedge recess 74 by a drive screw 28'. The wedge 26' is slotted (not shown) to receive the shaft of the connecting bolt (not shown) and to engage the head of the connecting bolt to lock the two members together.

The present invention involves numerous advantages over prior art connection mechanisms. The present invention is easily adjusted such that tolerances when drilling holes are not so specific and critical. The connection made using the invention may be used to repeatedly attach and detach objects together. This is particularly significant when the attachment is part of a multi-compartment assembly such as a railing system involving many components which must be fitted and secured together. Further, if the members attached together shrink or expand over time, adjustments are easily made to ensure all connections are secure.

The present invention is quicker and easier to use than a lag bolt, or the like, because the shape and orientation of the holes do not interfere with installation. When the present invention is employed, the longitudinal axis of the drive screw 28 is parallel to rather than perpendicular to the longitudinal axis of the access hole 36. When a lag bolt is employed, the longitudinal axis of the lag bolt is often perpendicular to the longitudinal axis of the axis hole. Likewise, there are typically no structures which will unduly interfere with mounting of the connecting screw 22 in place. No special tools are required. All that is required is the ability to use tools such as a tape measure, drill and screwdriver.

While the invention has been generally described as being used to assemble railing systems, the invention can also be effectively used to create a butt joint between two components of other assemblies. Thus, the invention is not intended to be limited to railing assembly. Likewise, the general principles of the invention can be employed using housing/cylinders and wedges having different shapes than those shown. Movement and locking of the wedge may also be accomplished using driving members other than the drive screw shown. For example, levers and over-center links may be employed without deviating from the invention. While a connecting screw is shown, other connecting members may also be successfully employed. Examples include bolts, rivets, spikes, nails and any other device connected to one member and able to pass through a through hole and long enough to reach the access hole. The connecting member should have a flange head or other structure adapted to be engaged and securely held by the wedge of the locking assembly positioned within the access hole. These and other modifications may be made without deviating from the invention. The invention is therefore not limited to only those embodiments disclosed, but instead covers any embodiment fully within the scope of the following claims.

What is claimed:

1. An apparatus for creating a butt joint between two members comprising:
    a housing adapted to be received within a first of the two members, said housing having a base, a bore extending through the base, and a pair of wall sections extending from the base and defining a first slot and a recess;
    a wedge adapted to be received within the recess of the housing and moved between a first unlocked position and a second locked position, said wedge having a second slot;
    a driving member extending through the bore of the housing and adapted to move the wedge between the first unlocked position and the second locked position and then retain the wedge in the second locked position; and
    a connecting member adapted to extend from a second of the two members, said connecting member comprising an elongate shaft and a head at one end of the shaft, the head adapted to be held by the wedge when the wedge is in the second locked position;
    wherein the bore and recess of the housing are substantially aligned with the elongate shaft of the connecting member between the head thereof and the second member, and wherein actuating the driving member moves the driving member towards the connecting member.

2. An assembly comprising:
    a first member having a side and an end, an access hole drilled in from the side and a through hole drilled in from the end and intersecting the access hole;
    a second member having a surface;
    an assembly for creating a butt joint between the end of the first member and the surface of the second member, said assembly comprising:
        an elongate connecting member connected to and projecting from the second member comprising an elongate shaft and terminating in a head, said head of the elongated connecting member adapted to pass through the through hole and into the access hole of the first member;
        a housing adapted to be received within the access hole of the first member, said housing having a base, a bore extending through the base, and a pair of wall sections extending from the base and defining a first slot and a recess;
        a wedge adapted to be received within recess of the housing and move within the recess between a first unlocked position and a second locked position in which the head of the elongate connecting member is captured by the wedge thereby securing the first member and second member together, said wedge having a second slot; and a driving member extending through the bore of the housing and adapted to move the wedge between the first unlocked position and the second locked position and then retain the wedge in the second locked position;

wherein the bore and recess of the housing are substantially aligned with the elongate shaft of the connecting member between the head thereof and the second member, and wherein actuating the driving member moves the driving member towards the elongate connecting member.

3. The assembly of claim 2 wherein the elongate connecting member has threads for securing the elongate connecting member to the second member.

4. The assembly of claim 2 wherein the elongate connecting member includes a mark.

5. The assembly of claim 2 wherein the elongate connecting member includes a stop.

6. The assembly of claim 2 wherein said access hole has a first longitudinal axis and said bore extending through the base has a second longitudinal axis and said first longitudinal axis is substantially parallel to said second longitudinal axis.

7. The assembly of claim 2 wherein the wedge moves within the recess from the unlocked to the locked position by being pivoted by the driving member.

8. The assembly of claim 2 wherein the wedge moves within the recess from the unlocked position to the locked position by being slid by the driving member.

9. The assembly of claim 2 wherein the bore extending through the base is threaded and the driving member is a screw having threads adapted to cooperate with threads of the bore for moving and locking the wedge.

10. The assembly of claim 2 further comprising a plug adapted to close the access hole after the first and second members are secured together.

* * * * *